(12) United States Patent
Amano et al.

(10) Patent No.: US 6,272,404 B1
(45) Date of Patent: Aug. 7, 2001

(54) FLIGHT PATH INDICATED APPARATUS

(75) Inventors: Takaki Amano; Eiichi Yamakawa, both of Kakmigahara (JP)

(73) Assignee: Advanced Technology Institute of Commuter-Helicopter, Ltd., Gifu (JP)

(*) Notice: Subject to any disclaimer, the term of this patent is extended or adjusted under 35 U.S.C. 154(b) by 0 days.

(21) Appl. No.: 09/250,281

(22) Filed: Feb. 16, 1999

(30) Foreign Application Priority Data

Mar. 24, 1998 (JP) ............................................... P10-076243

(51) Int. Cl.$^7$ ........................... G01C 23/00; B64D 45/00
(52) U.S. Cl. ................................. 701/3; 340/980; 345/7
(58) Field of Search ...................... 701/3, 4, 18; 340/972, 340/973, 974, 979, 980; 345/7, 113, 121

(56) References Cited

U.S. PATENT DOCUMENTS

| | | | |
|---|---|---|---|
| 4,419,079 | 12/1983 | Georges et al. | 434/43 |
| 4,999,780 | * 3/1991 | Mitchell | 701/16 |
| 5,003,305 | * 3/1991 | Kelly et al. | 340/974 |
| 5,272,652 | * 12/1993 | Rosenshein et al. | 364/578 |
| 5,289,185 | 2/1994 | Ramier et al. | 340/971 |
| 5,296,854 | 3/1994 | Hamilton et al. | 340/980 |
| 5,519,392 | 5/1996 | Oder et al. | 340/995 |
| 5,675,327 | 10/1997 | Coirier et al. | 340/973 |
| 5,675,328 | 10/1997 | Coirier et al. | 340/975 |
| 5,745,863 | * 4/1998 | Uhlenhop et al. | 701/14 |
| 5,798,713 | * 8/1998 | Viebahn et al. | 340/974 |
| 6,054,937 | * 4/2000 | Von Viebahn et al. | 340/961 |

FOREIGN PATENT DOCUMENTS

| | | |
|---|---|---|
| 0 384 993 | 9/1990 | (EP) . |
| 2 300 167 | 10/1996 | (GB) . |
| 57-45410 | 3/1982 | (JP) . |
| 5-112298 | 5/1993 | (JP) . |
| 5-338595 | 12/1993 | (JP) . |
| 8-63700 | 3/1996 | (JP) . |
| 8-210872 | 8/1996 | (JP) . |
| 9-91600 | 4/1997 | (JP) . |
| 9-118298 | 5/1997 | (JP) . |

* cited by examiner

*Primary Examiner*—Michael Zanelli
*Assistant Examiner*—E. Gibson
(74) *Attorney, Agent, or Firm*—Wenderoth, Lind & Ponack, L.L.P.

(57) ABSTRACT

A flight path display apparatus provided in a cockpit of an aircraft has a head-up display unit. An image combining panel of the head-up display unit displays a flight path image projected from projecting system which is superimposed on the outside view. Computing system for calculating the image to be projected to the image combining panel calculates a display position of the target flight path based on data from storage system in which predetermined flight paths are stored and from aircraft flight data measuring system for measuring the position and attitude of the aircraft. When the display position of the target flight path is outside a display area of the image combining panel, a target mark indicative of a direction toward the flight path from the center of the display area blinks on the image combining panel. With the above construction, a flight path display apparatus which allows a pilot to keep sight on a target flight path is realized.

3 Claims, 8 Drawing Sheets

FLIGHT PATH INDICATED APPARATUS

BACKGROUND OF THE INVENTION

1. Field of the Invention

The present invention relates to a flight path display apparatus which displays a flight path on a head-up display installed in a cockpit of an aircraft.

2. Description of Related Art

Hitherto there is provided a head-up display unit which is mounted in front of a canopy of a cockpit of an aircraft and has an image combining panel through which the light from the outside view and projected information of the aircraft data are combined, so that a pilot can obtain the aircraft flight data information while seeing the outside view.

There also exists a flight path display apparatus which indicates a target flight path by superimposing on the image combining panel of the head-up display to assist the pilot in landing to an airport for example. The pilot can land safely even under low visibility due to bad weather by controlling the aircraft so as to fly along this indicated flight path. When the aircraft is a fixed wing aircraft, for example, an approach course to an airport is straight approach and an approach angle is about 3°.

In contrary to that, an approach course of a helicopter is not a simple straight approach but is an approach of a three-dimensional curve and an approach angle also varies considerably from 3° to 12° because it has to approach while avoiding slapping noise and also avoiding flight paths of other aircraft for example. It is also difficult to enlarge the area of the image combining panel of the head-up display unit because the cockpit of the helicopter is narrow and the equipment thereof must be small. Accordingly, the field of view of the existing head-up display unit is very narrow. Further, because the helicopter can change the flight direction easily, there has been a problem that the target flight path is gone outside of the image combining panel and is lost when the aircraft nose is pointing some different direction from the target flight path even if it is flying near the target flight path. Such circumstance becomes a big problem under low visibility, e.g., when the ground surface is not visible in particular.

SUMMARY OF THE INVENTION

It is hence an object of the present invention to provide a flight path display apparatus which allows a pilot to keep a target flight path, in particular, even under low visibility.

The invention provides a flight path display apparatus comprising:

storage means for storing flight path data of the predetermined flight paths;

aircraft flight data measuring means for measuring a position and attitude of an aircraft;

computing means for calculating to display the position of the target flight path based on the predetermined flight path data and the aircraft flight data.; and head-up display means having projecting means for projecting the target flight path, and an image combining panel which is disposed in front of a pilot head and displaying the projected target flight path image by superimposing on the outside view, wherein a target mark indicative of a direction toward the target flight path from the center of a display area of the image combining panel is indicated on the image combining panel when the displayed position of the target flight path image is gone outside of the display area of the image combining panel.

According to the present invention, the target flight path is projected on the image combining panel of the head-up display unit. This target flight path image is calculated based on the position and attitude of the aircraft obtained from the aircraft flight data measuring means and based on the predetermined flight path data and is indicated on the image combining panel which is provided in front of a pilot head with being superimposed on the outside view. Accordingly, the pilot can control the aircraft along the indicated target flight path while looking forward. It also allows the pilot to control the aircraft along the target flight path even under low visibility condition.

When the aircraft is pointing in the direction different from the target flight path, the displayed position of the target flight path image is gone outside of the display area of the image combining panel. In this case, the direction toward the target flight path from the center of the display area of the image combining panel is indicated on the image combining panel by the target mark. Accordingly, the target flight path image appears on the image combining panel by turning the aircraft in the direction indicated by this target mark. Thus, the pilot can find the target flight path readily without losing it even when no target f-light path image is displayed on the image combining panel under low visibility.

In the invention it is preferable that the computing means calculates a distance between the target flight path and the aircraft position and changes the display pattern corresponding to the distance.

According to the invention, the display pattern is changed corresponding to the distance between the aircraft position and the target flight path, so that the pilot can readily understand the distance to the target flight path, thus reducing the workload, even when the target flight path is not indicated on the image combining panel.

In the invention it is preferable that the target flight path image is composed of a plurality of path marks and each path mark inclines corresponding to the attitude of the aircraft supposed when the aircraft is positioned at each path mark.

According to the invention, each path mark of the target flight path image inclines corresponding to the supposed attitude of the aircraft, e.g., the bank angle, as described above, so that the pilot can fly the aircraft along the flight path by controlling so that the bank angle of the aircraft coincides with each indicated path mark.

In the invention it is preferable that when the flight path is turning, a turn mark indicative; of an angle of turn is indicated on the image combining panel.

According to the invention, because the turn mark indicates the angle of turn, the pilot can understand the angle of turn and can anticipate the turn ending position from that even if the flight path turns significantly and a turn ending position is gone outside of the display area of the image combining panel. Thereby, the workload of the pilot can be reduced.

In the invention it is preferable that the computing means calculates a distance between a landing spot and the aircraft and erases the display of the image combining panel when the distance becomes shorter than a predetermined distance.

According to the invention, the display of the image combining panel is erased when the aircraft approaches the landing spot. Normally, the pilot lands visually by contact flight when the aircraft approaches near the landing spot and the landing spot is visible. While the display image of the head-up display unit might become annoying in such a case, such annoyance is removed and the pilot workload during landing may be reduced by the invention because the display of the image combining panel is erased when the distance between the landing spot and the aircraft becomes shorter than the predetermined distance.

In the invention it is preferable that the pilot is allowed to erase some part of the display of the image combining panel selectively.

According to the invention, the pilot can erase the display selectively, so that it is possible to show the flight path clearly by erasing a display of heading when the path marks overlap with the display of heading and the target flight path is hardly recognized for example.

In the invention it is preferable that a relative positional relationship between the position of the aircraft and a landing/take-off spot and a landing/take-off flight path are displayed on the side of an altitude indicating section of the image combining panel during landing/taking off, and the landing/take-off spot is displayed at the edge of the display area on the side of the landing/take-off spot when the landing/take-off spot is gone outside of the display area of the image combining panel.

According to the invention, the display apparatus allows the pilot to readily understand the relative positional relationship between the position of the aircraft and the landing/take-off spot even when the landing/take-off spot is gone outside of the display area, so that the workload of the pilot may be reduced during landing/take-off operation from a rooftop heli-spot for example.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
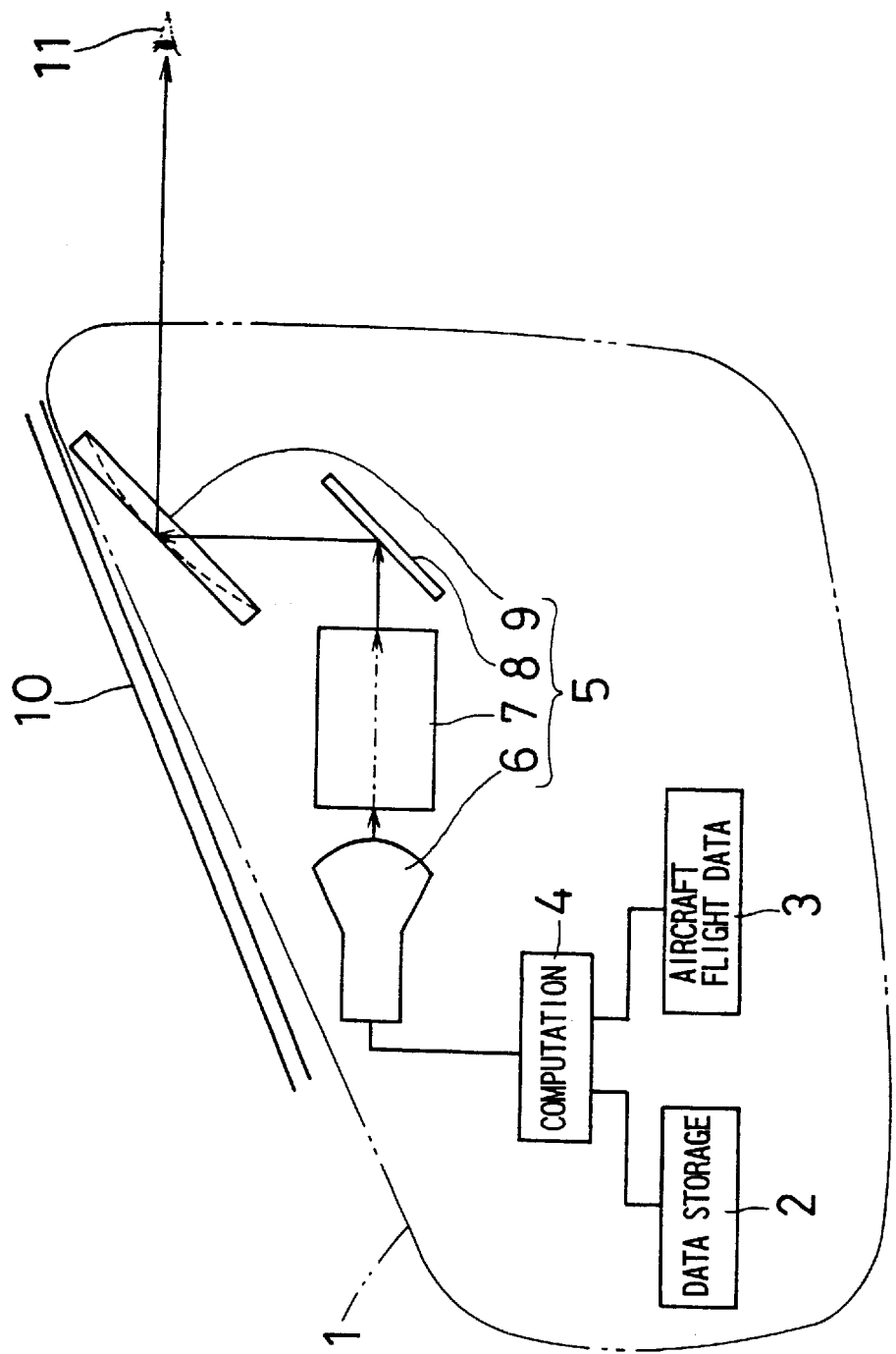
FIG. 1 is a block diagram showing the structure of a flight path display apparatus 1 according to one embodiment of the present invention.

Now referring to the drawings, preferred embodiments of the invention are described below.

FIG. 1 is a block diagram showing the structure of a flight path display apparatus 1 according to one embodiment of the present invention. The flight path display apparatus 1 is installed in a cockpit of a helicopter and comprises data storage means 2, aircraft flight data measuring means 3, computing means 4 and a head-up display unit 5.

The data storage means 2 is provided in a FMC (Flight Management Computer) and stores flight path data of predetermined flight paths. Such flight path data may be an approach path to an airport given from a landing assisting system of the landing airport for another example.

The aircraft flight data measuring means 3 has an attitude indicator and a navigation system. The attitude indicator measures attitude data such as pitch angle and wing roll (bank) angle by a gyroscope and the navigation system measures aircraft flight data such as a position, flight direction (heading of the aircraft), distance and other data of the aircraft measured by GPS for example.

The head-up display unit 5 has projecting means 6, a relay lens 7, a reflecting mirror 8 and an image combining panel 9. The projecting means 6 projects an image on the image combining panel 9 via the relay lens 7 and the reflecting mirror 8. The image combining panel 9, which is called, for example, a combiner, is disposed inside a canopy 10 in front of a pilot's head. The image combining panel 9 reflects only light of a specific wavelength, and transmits other wavelengths, therefore enabling a pilot 11 to see an outside view. Accordingly, a pilot 11 can visually perceive the image of the aircraft data from the projecting means 6, which projects light of a specific wavelength, while superimposing the outside view on the image combining panel 9.

The computing means 4 calculates the altitude, speed and heading of the aircraft to be indicated based on the aircraft flight data to indicate on the image combining panel 9 and calculates the position of the target flight path to be indicated on the image combining panel 9 based on the predetermined flight path data stored in the storage means 2 to display the target flight path on the image combining panel 9 as an image.

Accordingly, it allows the pilot 11 to visually perceive the aircraft data through the image combining panel 9 while looking forward and seeing outside without looking down at flight instruments on the instrument panel which is installed below a canopy 10. Control by the pilot is facilitated by superimposing the image of the target flight path to be followed on the outside view. It also allows flight even under low visibility, by superimposing the image of the target flight path to be followed on the virtual outside view.

Accordingly, it allows the pilot 11 to visually perceive the aircraft data through the image combining panel 9 while looking forward and seeing the outside without looking down flight instruments on the instrument panel which is installed below a canopy 10, and the control of the pilot is facilitated by superimposing the image of the target flight path to be followed on the outside view. It also allows flight even under low visibility by superimposing the image of the target flight path to be followed on the virtual outside view.

Figure 2:
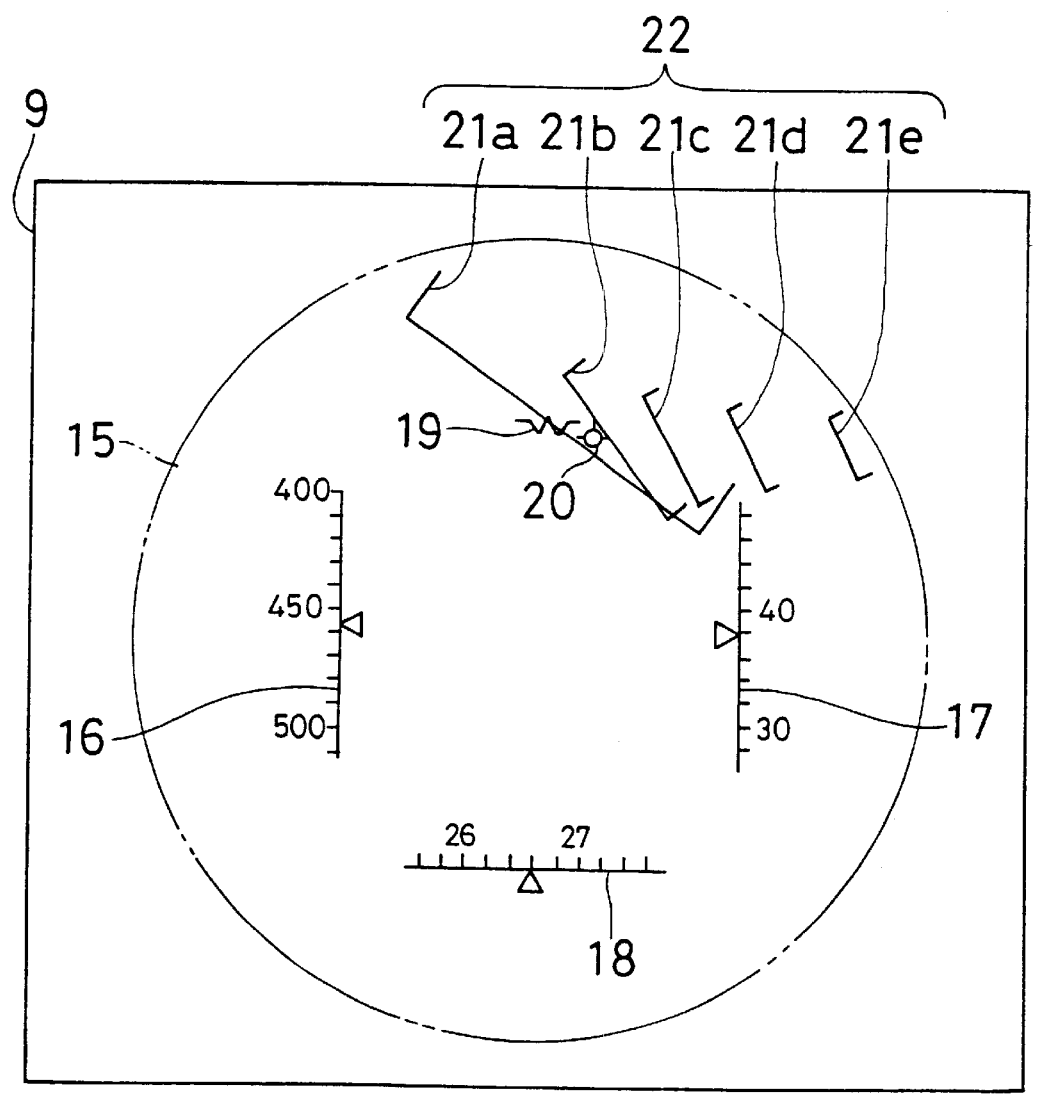
FIG. 2 is a front view of an image combining panel 9.

FIG. 2 is a front view showing one example of a display image displayed on the image combining panel 9. The image combining panel 9 has a circular display area 15 in which an altimeter 16 is indicated on the left side thereof, a speed indicator 17 is indicated on the right side and an aircraft heading 18 is indicated at the lower part.

A flight path image 22 which is an image of the target flight path to be followed is composed of a plurality of path marks 21a through 21e. The respective path marks 21a through 21e are indicated along the flight path at the positions where the aircraft should be positioned at a certain interval. The path marks 21 are indicated linearly on the whole such that the path mark at a long distance is represented shorter than the path mark at a short distance by utilizing the perspective representation. It allows the pilot to understand intuitively that which mark is the closest and which mark is the farthest among the plurality of path marks 21a through 21e.

On the image combining panel 9, the aircraft itself is represented by a W-shaped own-aircraft symbol 19, and a velocity vector 20 is indicated approximately by a circle. The velocity vector 20 indicates the position where the aircraft is positioned at the next moment when it flies in the present state. Accordingly, it becomes possible to fly the own-aircraft symbol 19 along the respective path marks 21a through 21e and to fly the aircraft accurately along the target flight path by controlling so that the velocity vector 20 passes through the middle of the respective path marks 21.

The own-aircraft symbol 19 is indicated horizontally as the reference without inclination. The respective path marks 21a through 21e are indicated with inclination corresponding to a difference between the target bank angle of the aircraft supposed when the aircraft is positioned at each path mark 21 and the current bank angle of the aircraft. Because the bank angle of the aircraft needs to be tilted to the right in FIG. 2, the respective path marks 21a through 21e are indicated while inclining to the right. Accordingly, it is possible to turn accurately along the respective path marks 21a through 21e by controlling so that the angle of inclination of the path mark 21a which is the closest mark where the own-aircraft symbol 19 first passes through coincides with the angle of inclination of the own-aircraft symbol 19.

Figure 3:
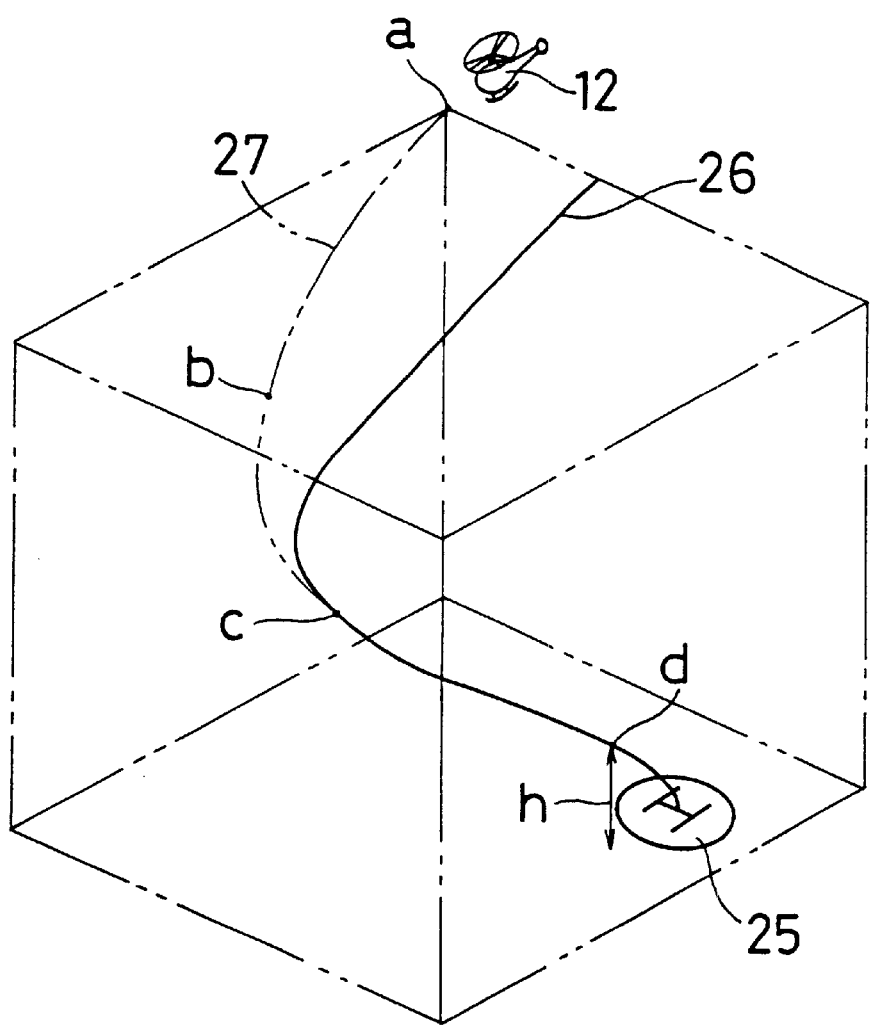
FIG. 3 is a perspective view showing a predetermined flight path 26 and an actual flight path 27 of an aircraft.

FIG. 3 is a perspective view showing one example of a predetermined flight path 26 and an actual flight path 27 of the aircraft 12 in landing on a heli-spot 25. It is noted that the space in the vicinity of the heli-spot 25 is represented by a cube of imaginary lines for convenience to facilitate the understanding of the drawing.

Figure 4A:
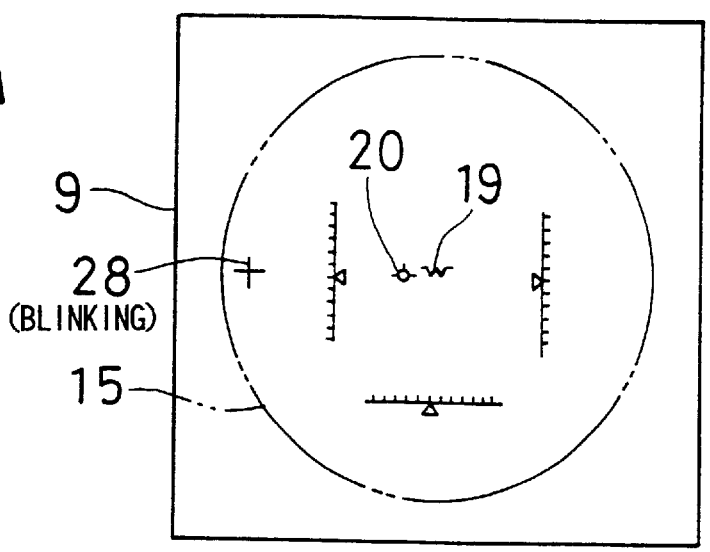
FIGS. 4A through 4C are front views showing display images of the image combining panel 9 displayed at respective positions a through c of the actual flight path 27 of the aircraft.

The predetermined target flight path 26 is indicated by a solid line and the actual flight path 27 of the aircraft 12 is indicated by an imaginary line in FIG. 3. FIG. 4A shows a display of the image combining panel 9 when the aircraft is positioned at the position a. Because the aircraft 12 is flying almost in parallel with the target flight path 26 on the right side of the target flight path 26 at the position a, the display position of the target flight path is gone outside of the display area 15 of the image combining panel 9 and the flight path image 22 is not displayed on the image combining panel 9. In this case, the computing means 4 calculates a position of the target flight path 26 with respect to the position of own aircraft from positional data of the aircraft 12 obtained from the aircraft flight data measuring means 3 and the target flight path data stored in the storage means 2 to display a target mark 28 pointing the direction of the target flight path from the center position of the display area 15 of the image combining panel 9. The target mark 28 of "+" may blink at the peripheral edge portion of the display area 15 where the target flight path 26 is positioned outside of the edge.

That is, the target mark 28 blinks at the left edge of the display area 15 of the image combining panel 9 as shown in FIG. 4A at the aircraft position a.

The two dimensional position of the target flight path may be displayed as a position on the target flight path 26 closest to the aircraft 12 or may be displayed as a position on the target flight path slightly ahead of the closest position to the flight direction by taking into account the flight direction of the aircraft 12.

The computing means 4 also calculates a distance between the position of the aircraft and the target flight path 26 to change the blinking interval of the target mark 28 corresponding to the distance. For instance, the blinking interval of the target mark 28 is shortened gradually as the aircraft 12 approaches to the target flight path 26 or the blinking interval of the target mark 28 is prolonged conversely as the aircraft leaves from the target flight path 26. It allows the pilot to understand easily whether the aircraft is approaching to or leaving from the target flight path 26 even under low visibility.

It is also possible to display the distance between the target flight path 26 and the aircraft 12 by numerical indication in the vicinity of the target mark 28 without changing the blinking interval.

Figure 4B:
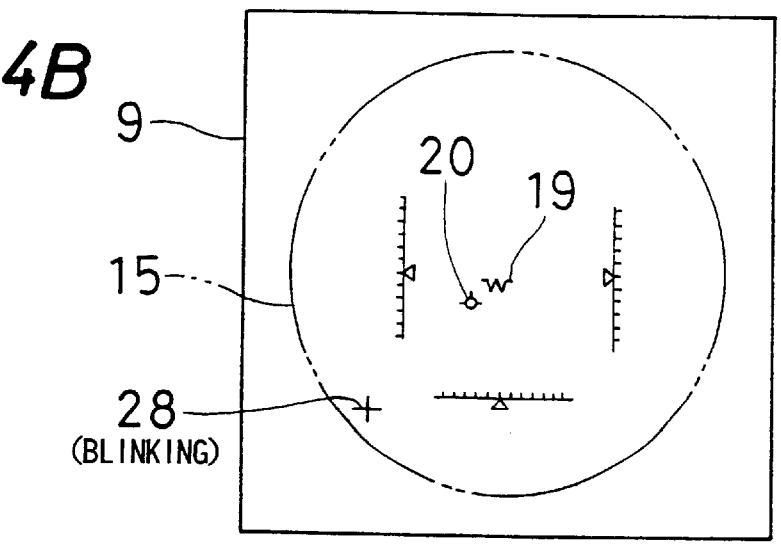

FIG. 4B shows an image displayed on the image combining panel 9 when the aircraft 12 has reached to the position b from the position a along the flight path 27 indicated by the imaginary line. At this time, the blinking interval of the target mark 28 is shortened gradually because the aircraft 12 is approaching to the target flight path 26 as it flies from the position a to the position b as it is apparent from FIG. 3. Because the target flight path 26 is positioned at the lower left side at the position b, the target mark 28 blinks at the lower left edge of the display area 15 as shown in FIG. 4B.

Figure 4C:
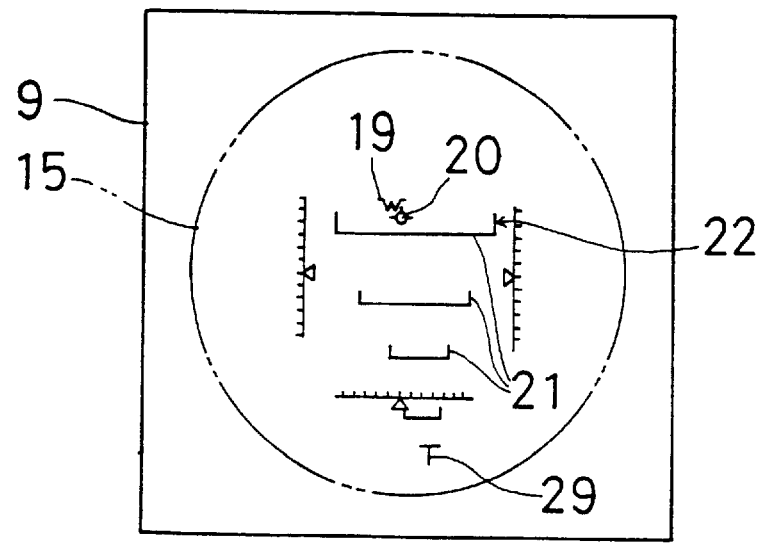

When the aircraft 12 flies further and reaches to the position c in FIG. 3, the aircraft 12 flies close to the target flight path 26. Then, the flight path image 22 is displayed on the image combining panel 9 as shown in FIG. 4C. When the flight path image 22 enters the display area 15, the target mark 28 is erased. A T-shaped target heli-spot mark 29 is indicated in the flight path image 22 as shown in FIG. 4C. The pilot visually perceives this heli-spot mark 29 superimposed on the actual heli-spot 25. The aircraft 12 is guided to the actual heli-spot 25 safely by using this heli-spot mark 29 even under low visibility and the pilot has only to control the aircraft along the flight path image 22.

When the aircraft 12 approaches near to the heli-spot 25 so that the pilot can see the heli-spot 25 easily, the pilot lands the helicopter on the heli-spot 25 visually by contact flight without using to the flight path image 22. Because there is a case when the helicopter lands vertically on the heli-spot 25, differing from fixed wing aircrafts, the target flight path lies right under the aircraft 12 during touch down and the flight path image 22 is not displayed on the image combining panel 9.

Accordingly, the computing means 4 calculates the distance between the position of the aircraft 12 and the heli-spot 25 and erases the image displayed on the image combining panel 9 when this distance becomes shorter than a predetermined distance. The position at this time is the position d in FIG. 3 for example. It is also possible to control so as to erase the image displayed on the image combining panel 9 when a distance to the ground surface becomes shorter than a predetermined visible altitude h, not judging by the distance between the aircraft 12 and the heli-spot 25.

It is also possible to arrange so as to erase the flight path image 22 and to display only aircraft flight data, not erasing all of the display of the image combining panel 9, or to display only necessary aircraft flight data selectively and to erase those other than that, when the distance between the aircraft 12 and the heli-spot 25 becomes shorter than the predetermined distance. It is also possible to control so as to display or erase the flight path image 22 automatically corresponding to the situation whether or not the heli-spot 25 is visible.

Figure 5:
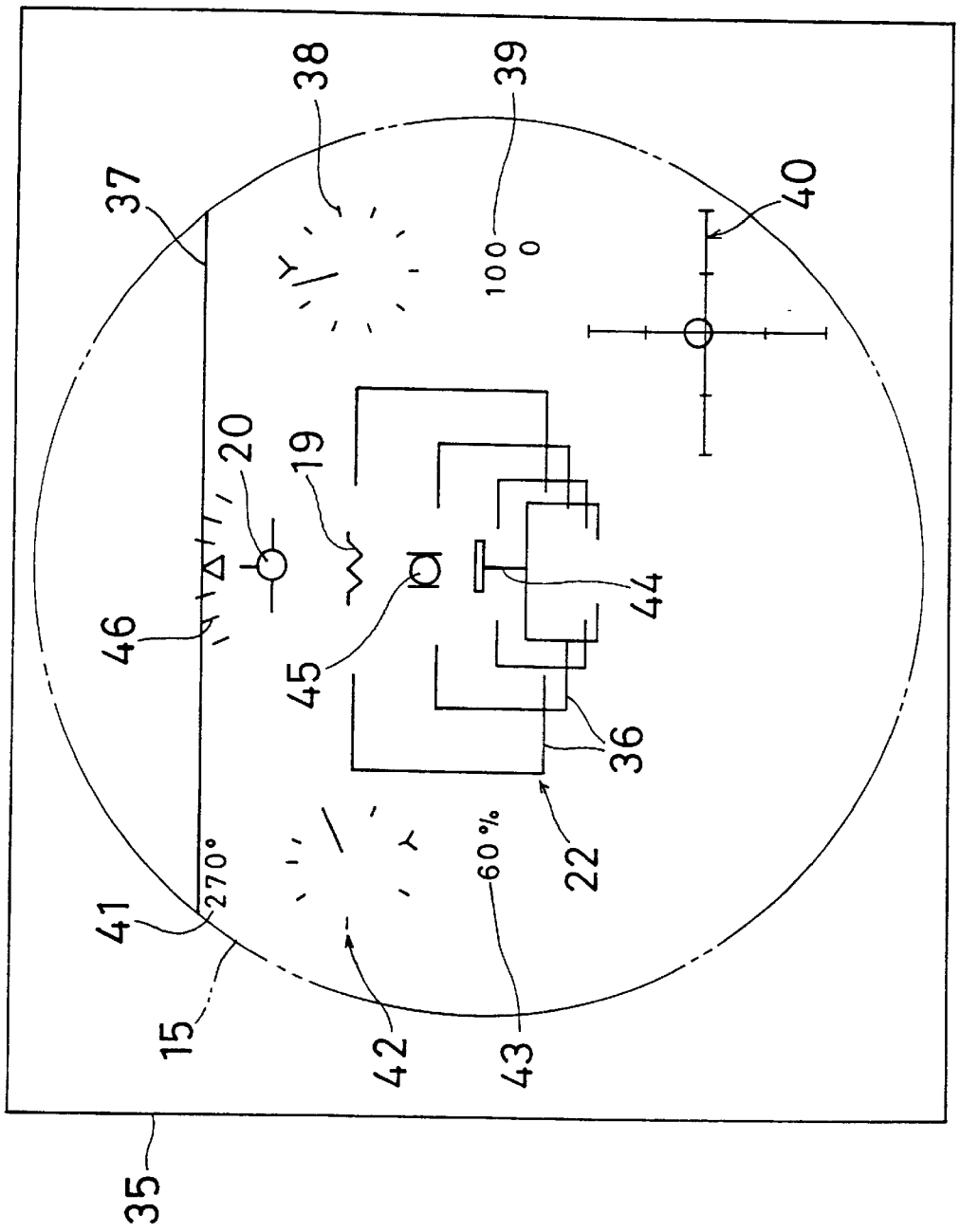
FIG. 5 is a front view showing another image combining panel 35.

FIG. 5 is a front view showing an image combining panel 35 provided in a flight path display apparatus according to another embodiment of the present invention. It is noted that the components corresponding to those in the image combining panel 9 shown in FIG. 2 are denoted by the same reference numerals and the structure other than the image combining panel 35 is the same as that of flight path display apparatus 1. In FIG. 5, a horizontal line 37 is indicated straightly across the display area 15 and a barometric altimeter 38, a vertical speed indicator 39 and a course deviation 40 are indicated on the right side of the display area 15. The course deviation 40 indicates deviations from the target flight path in the horizontal and vertical directions.

An azimuth angle of the aircraft heading 41, an airspeed indicator 42 and a torque meter 43 are indicated on the left side of the display area 15. A bank angle indicator 46, the velocity vector 20, the own-aircraft symbol 19 and a slip ball 45 are indicated in this order from the top at the center of the display area 15.

The flight path image 22 displayed on the image combining panel 35 as described above is composed of a plurality of path marks 36 provided at intervals along the flight path similarly to those displayed on the image combining panel 9. Each path mark 36 is composed of a pair of "[" shaped marks facing to each other symmetrically. Such path marks 36 are indicated such that the farther from the aircraft, the smaller the size thereof becomes by utilizing the perspective representation to make the pilot to understand the flight path intuitively. A heli-spot mark 44 in which a straight line indicative of an approach direction is appended to the square heli-spot is shown at the center of the display area 15 in FIG. 5.

Figure 6:
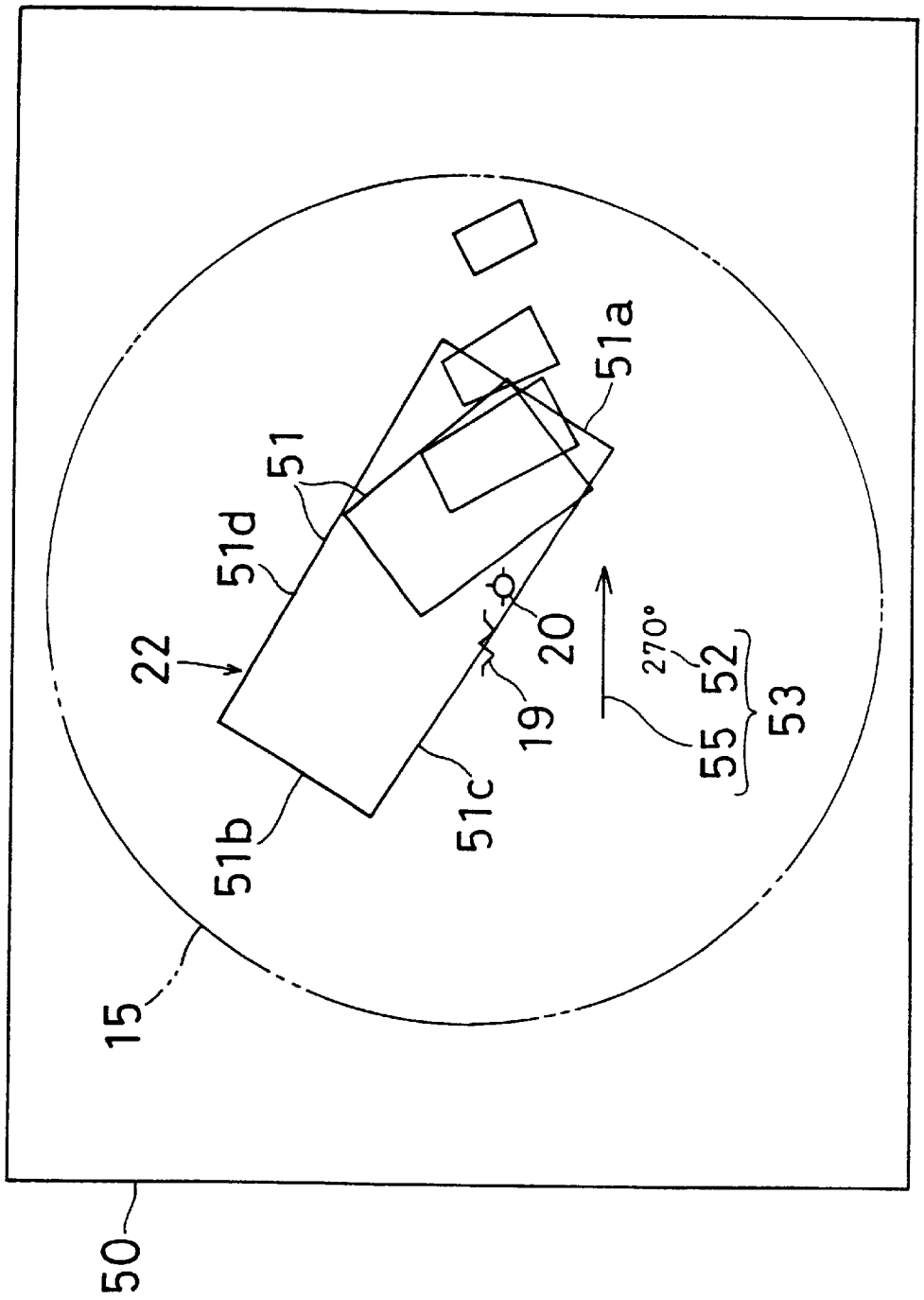
FIG. 6 is a front view showing another image combining panel 50.

FIG. 6 is a front view showing an image combining panel 50 provided in a flight path display apparatus of another embodiment of the present invention. It is noted that the apparatus has the same structure with the flight path display apparatus 1 except of the image combining panel 50. Among those indicated on the image combining panel 50, the display contents corresponding to those indicated on the image combining panels 9 and 35 will be denoted by the same reference numerals and an explanation thereof will be omitted here.

A turn mark 53 indicative of a turn is indicated at the lower part of the display area 15 of the image combining panel 50 when the flight path is turning. The turn mark 53 is composed of an arrow 55 and an angle indication 52. The arrow 55 indicates the turning direction whether it is right or left and the angle indication 52 indicates an azimuth angle of the turning direction by numerals. The azimuth angle of the angle indication 52 is 270° in FIG. 6, so that it indicates that the flight path turns to the azimuth angle of 270°. The arrow 55 also makes the pilot to understand instantly that the flight path turns to right. Accordingly, even if the flight path turns largely and a turn ending position is gone outside of the display area 15, the turn mark 53 shows the pilot to understand clearly how much he should make the turn, thus improving the controllability.

Further, while there has been a problem that the flight path might become vague and the field of view might be narrowed when a large number of path marks 51 are superimposed when the flight path is turning or that the flight path might be unidentified when the number of path marks 51 is reduced on the other hand, the pilot can understand the degree of turn clearly even if there is less number of path marks 51, thus improving the controllability, by displaying the turn mark 53 like the present invention.

Such turn mark 53 may be indicated not only in the case when the flight path turns to right or Left but also in the case when the flight path ascends or descends by indicating the vertical ascending/descending direction by the arrow 55 and by indicating a target value of ascending/descending rate numerically instead of the angle indication 52.

It is also possible to arrange so that the arrow 55 blinks to attract the attention of the pilot when the flight path is turning, and to shorten the blinking interval as the aircraft approaches the turn starting position to inform the pilot that the aircraft is approaching the turning position. It is also possible to arrange so as to change the length of the arrow 55 corresponding to the angle of turn to make the pilot to understand the angle of turn intuitively. Further, not only indicating the turn direction by the azimuth angle, the angle of turn 52 may be arranged so as to indicate the remaining angle of turn to the turn ending position by calculating the turn ending position and the current aircraft position by the computing means 4 when the aircraft is turning. Correspondingly, the arrow 55 may be indicated so that the length thereof is shortened corresponding to the remaining angle of turn.

The flight path image 22 displayed on the image combining panel 50 is composed of a plurality of rectangular path marks 51 as shown in FIG. 6 and the pilot is required to control so that the own-aircraft symbol 19 passes through the center of each path mark 51. The path mark 51 of the near side is indicated large and the far side path mark 51 is indicated small by utilizing the perspective representation.

When the flight path is turning, each path mark 51 inclines corresponding to the bank angle of the aircraft supposed when the aircraft is positioned at each position. The path marks 51 may be indicated inclined to right or left corresponding not only to the bank angle of the aircraft but also to the attitude of the aircraft supposed when the aircraft is positioned on the path mark 51 by utilizing the perspective representation. When the flight path is turning right for example, a right edge 51a of the path mark 51 at the near side is indicated to be longer than a left edge 51b. Similarly, when the flight path is ascending, an upper edge 51d of the near side path mark 51 is indicated to be longer than a lower edge 51c at the far side. Such rectangular path mark 51 allows the attitude of the aircraft at that position to be indicated, thus improving the controllability further.

Figure 7:
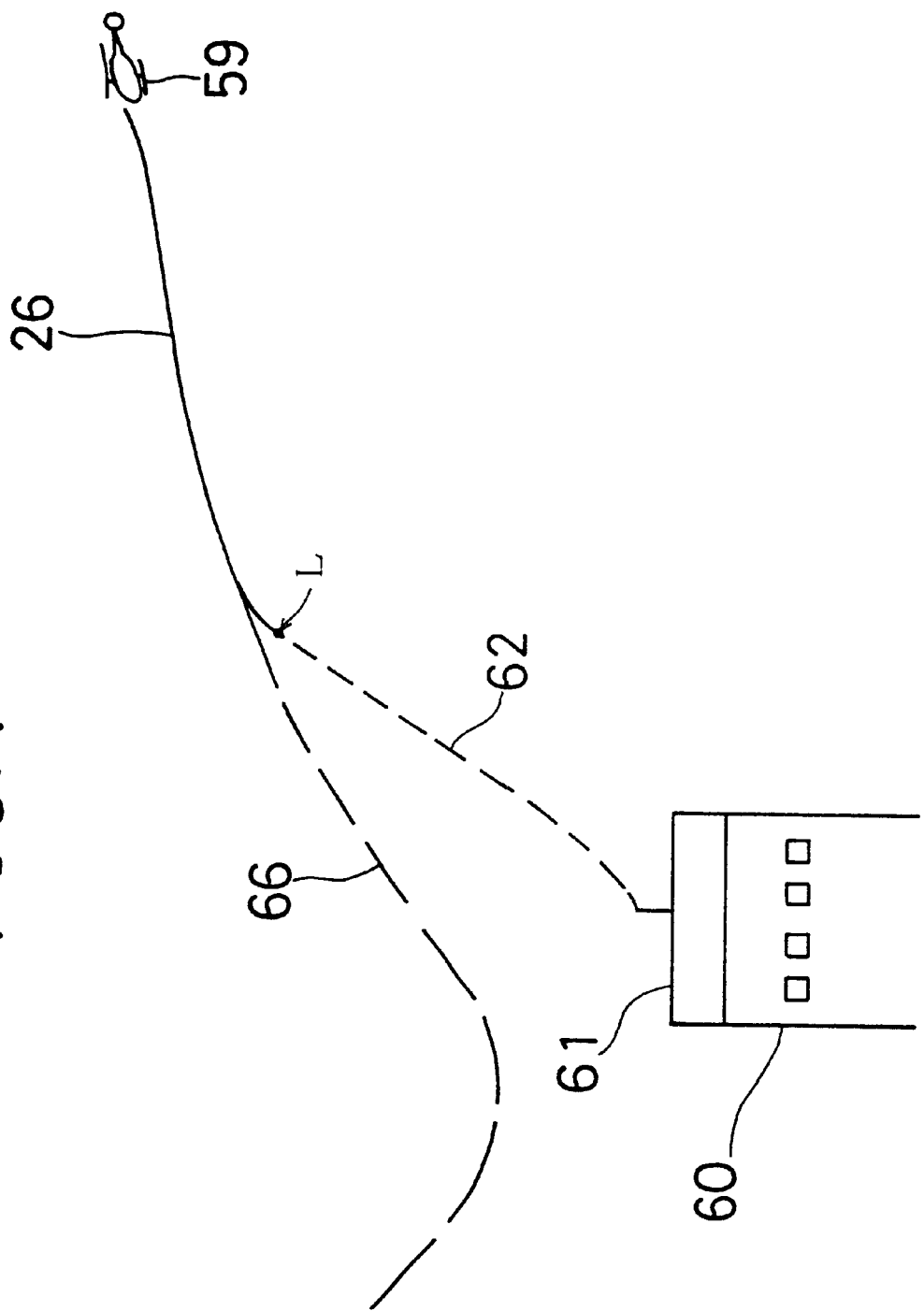
FIG. 7 is a diagram showing a flight path when a helicopter 59 lands on a rooftop heli-spot.
Figure 8A:
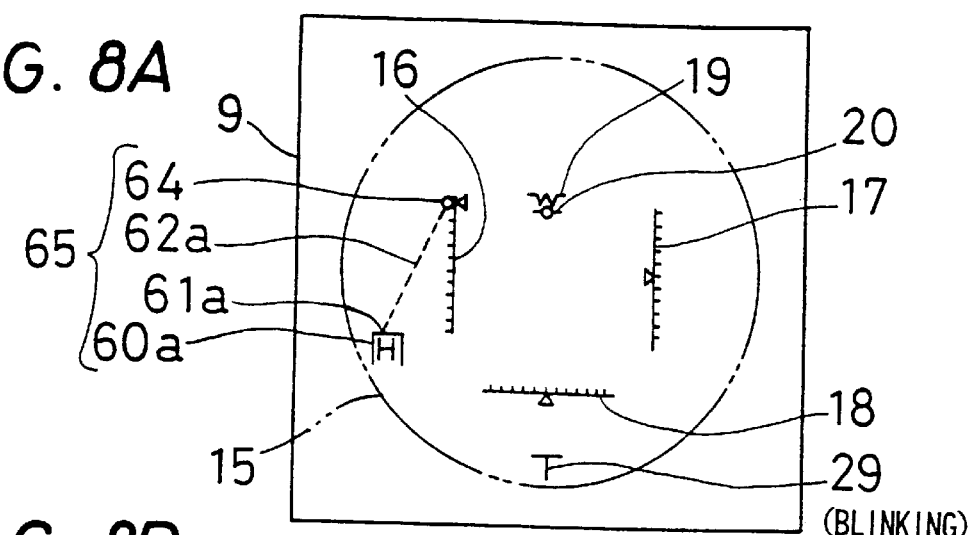
FIGS. 8A through 8C are front views showing display modes of the image combining panel 9 when the helicopter 59 lands on the rooftop heli-spot.
Figure 8B:
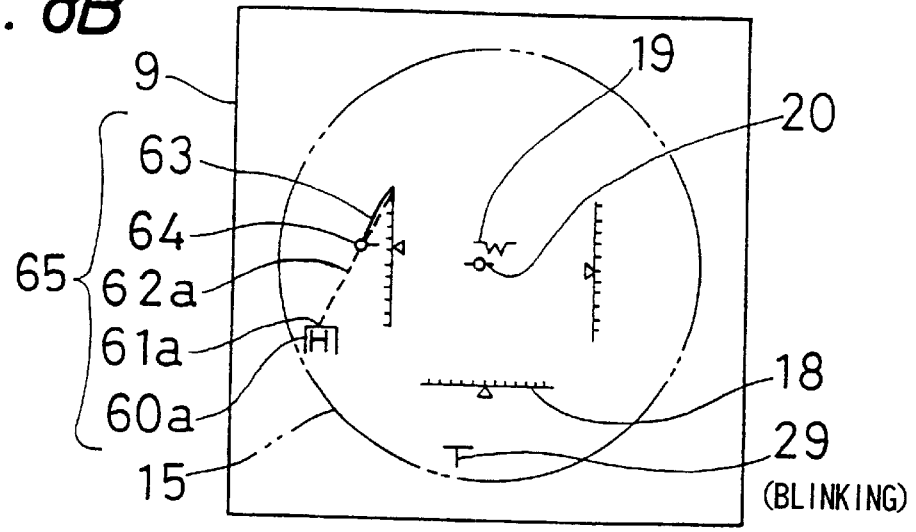
Figure 8C:
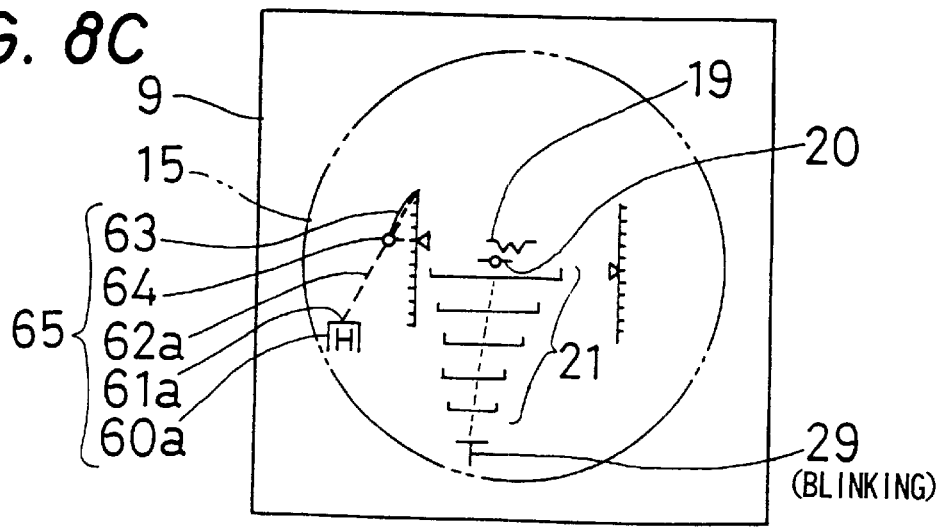

FIG. 7 is a diagram showing a flight path when a helicopter 59 is going to land on a rooftop heliport 61 and FIGS. 8A through 8C are front views showing display modes of the image combining panel 9 of the flight path display apparatus 1 at this time. Suppose that the helicopter 59 is a twin-engined helicopter and is landing on the rooftop heliport 61 of a building 60 for example.

The helicopter 59 flies to the point near the critical decision point L along the flight path 26. When one of the engines fails at the altitude higher than the critical decision point L for example, the helicopter 59 abort to land on the rooftop heliport 61 and flies toward an alternate heliport having a wider landing area by taking a new flight path 66.

When the helicopter 59 has descended to the altitude lower than the critical decision point L, the helicopter 59 must land on the rooftop heliport 61 through a landing path 62. At this time, the landing path 62 becomes steep close to vertical and the pilot may be required to visually perceive the rooftop heliport 61 through a lower windshield glass at his feet in the normal helicopter 59.

FIGS. 8A through 8C show example indication of the flight path on the image combining panel 9 which is effective also in such circumstance. FIG. 8A shows the case when the helicopter 59 is right above the critical decision point L and is facing to the rooftop heliport 61. In this case, the own-aircraft symbol 19, the velocity vector 20 and a heli-spot mark 29 are lined up vertically at the center of the image combining panel 9, and the heli-spot mark 29 which is positioned outside of the display area 15 is indicated as the blinking mark.

In the present embodiment, the altitude indicated by the altimeter 16 is not the altitude from the ground surface but is replaced by relative altitude from the critical decision point L to a symbol 61a of the rooftop heliport. A landing/take-off indication 65 for indicating the relative positional relationship between the aircraft position of the helicopter 59 and the rooftop heliport 61 is shown at the left side of the altimeter 16 by a symbol 64 of the helicopter, a symbol 60a of the building, the symbol 61a of the rooftop heliport and a symbol 62a of the target landing path. The respective symbols 64, 60a and 61a of the landing/take-off indication 65 are started to be indicated when the helicopter 59 has reached the critical decision point L. The target landing path 62a indicates the landing path from the critical decision point L to the rooftop heliport. 61 by a broken line from a point of view of seeing it from the side thereof. The helicopter symbol 64 indicates the position of the aircraft with respect to the landing path 62a by a small circle. The building symbol 60a and the rooftop heliport symbol 61a are shown by a square and a letter H. They allow the pilot to readily understand the relative positional relationship between the rooftop heliport 61 and the position of the aircraft.

FIG. 8B shows a state in which the helicopter 59 is descending at the altitude slightly below the critical decision point L and at the position deviating slightly to the right with respect to the rooftop heliport 61. A landing path symbol 63 of the actual aircraft is indicated by a solid line and the helicopter symbol 64 is shown at the lowermost end thereof in the landing/take-off indication 65.

FIG. 8C shows a display mode in displaying also the path marks 21 when the aircraft is positioned at the same position with that in FIG. 8B. The indication of the path marks 21 indicates the deviation from the flight path in the right/left direction of the helicopter 59 which has deviated to the right side with respect to the rooftop heliport 61 to be readily corrected by the pilot. The display of the aircraft heading 18 is erased selectively so that the path marks 21 do not overlap with the display of other aircraft flight data.

It is noted that although the above explanation has been made all by exemplifying the case of landing, the present embodiment is applicable also to the case of taking off from the rooftop heliport 61.

Further, although the helicopter has been exemplified as the type of the aircraft, the effect of the present invention may be fully exerted also when the aircraft is a fixed wing aircraft or a VTOL aircraft (vertical take-off and landing aircraft) such as a tilt rotor aircraft.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A flight path display apparatus comprises:

storage means for storing flight path data of predetermined flight paths;

aircraft flight data measuring means for measuring a position and attitude of an aircraft;

computing means for calculating a display position of a target flight path based on the predetermined flight path data and aircraft flight data; and head-up display means having projecting means for projecting the target flight path, and an image combining panel, which is disposed in front of a pilot head and for displaying the projected target flight path image by superimposing on the outside view, wherein said projecting means is operable to project a target mark, indicative of a direction toward the target flight path from the center of a display area of the image combining panel as provided by said computing means, and wherein said projecting means is operable to blink said target mark at a peripheral edge portion of the image combining panel when the displayed position of the target flight path image is outside of the display area of the image combining panel.

2. The flight path display apparatus of claim 1, wherein the computing means calculates a distance between the target flight path and the aircraft position and changes a blinking interval corresponding to the distance.

3. The flight path display apparatus of claim 1, wherein a relative positional relationship between the position of the aircraft and a landing/take-off spot and a landing/take-off flight path are displayed on the side of an altitude indicating section of the image combining panel during landing/taking off, and a landing/take-off mark is displayed at the edge of the display area on the side corresponding to the landing/take-off spot when the landing/take-off spot is outside the display area of the image combining panel.

* * * * *

UNITED STATES PATENT AND TRADEMARK OFFICE
CERTIFICATE OF CORRECTION

PATENT NO. : 6,272,404 B1
DATED : August 7, 2001
INVENTOR(S) : Takaki Amano, Eiichi Yamakawa and Takaaki Taira It is certified that error appears in the above-identified patent and that said Letters Patent is hereby corrected as shown below:

<u>Title page,</u>
Item [75], please add -- Takaaki Taira --.

Signed and Sealed this

Twenty-seventh Day of August, 2002

Attest:

Attesting Officer

JAMES E. ROGAN
Director of the United States Patent and Trademark Office